March 2, 1937. H. VAN HARTINGSVELT 2,072,390
APPARATUS FOR TAKING PHOTOGRAPHS OF THE UPPER AND LOWER JAW
Filed March 30, 1936 2 Sheets-Sheet 1

INVENTOR.
H. Van Hartingsvelt
BY
Glascock Downing Seebold
ATTORNEYS.

March 2, 1937. H. VAN HARTINGSVELT 2,072,390
APPARATUS FOR TAKING PHOTOGRAPHS OF THE UPPER AND LOWER JAW
Filed March 30, 1936 2 Sheets-Sheet 2
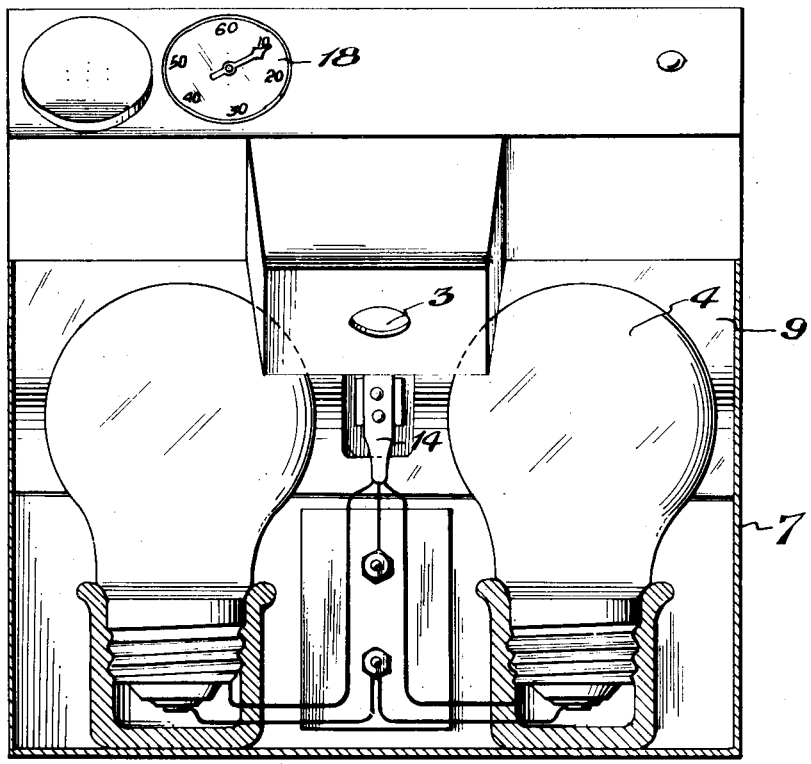
Fig. 2.
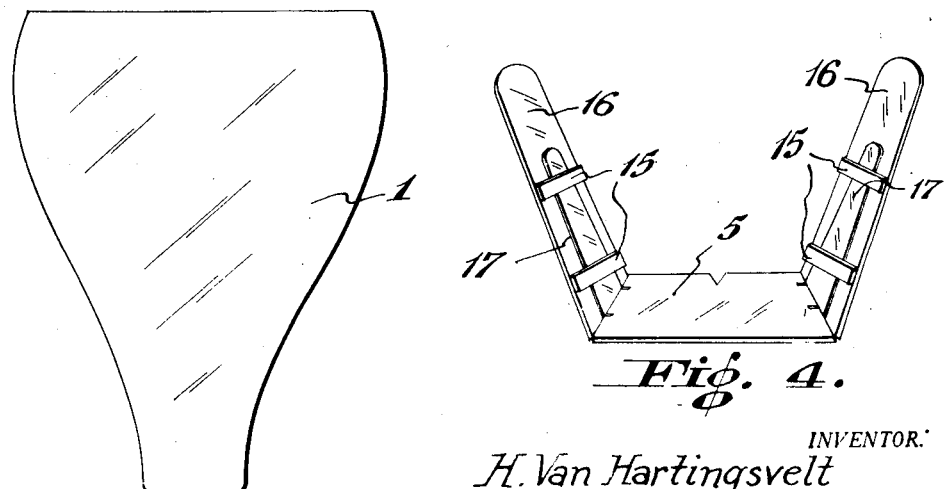
Fig. 3.
Fig. 4.
INVENTOR.
H. Van Hartingsvelt
BY:
Glascock Downing Seebold
ATTORNEYS.

Patented Mar. 2, 1937

2,072,390

UNITED STATES PATENT OFFICE 2,072,390

APPARATUS FOR TAKING PHOTOGRAPHS OF THE UPPER AND LOWER JAWS

Hendrik van Hartingsvelt, Bussum, Netherlands

Application March 30, 1936, Serial No. 71,760
In the Netherlands January 3, 1935

9 Claims. (Cl. 95—11)

The present invention relates to an instrument adapted to take photographs in the opened mouth of the entire upper or lower jaw.

Heretofore it has been proposed to use a combination of mirrors and objectives for the purpose of photographing objects which can only be brought into the field of image with great difficulty. Such apparatus, however, is not suitable for taking photographs of the jaw because to do so necessitates placing the objective very closely before the lip and also to introduce the mirror or mirrors into the mouth. To the present time photographing the mouth has not yet been satisfactorily achieved.

Apparatus has also been proposed for photographing cavities in the body, such as the stomach or bladder, in which apparatus the camera is provided with a source of light to illuminate the cavity of the body.

With the object of providing an instrument adapted to take photographs of the jaws I provide an apparatus comprising a particularly shaped mirror which may be introduced into the mouth and placed onto the teeth of the jaw, opposite to the jaw to be photographed, said mirror being attached to a camera in such a way that all occlusal surfaces of the teeth of the jaw may be photographed without distortion.

In contradistinction to the known apparatus I place the source of light outside the mouth so that the light intensity may be increased to a sufficient degree to enable taking snapshots. By the invention it is possible to construct cameras of any desired dimension whereas the known apparatus for taking photographs, say of the stomach and the bladder must have limited dimensions.

In carrying out the invention I may provide two mirrors of a particular shape one of said mirrors being adapted to be introduced into the vestibulum oris in such a way that by means of said mirror a photograph of the vestibular surfaces may be taken simultaneously with that of the occlusal surfaces, and the other of said mirrors being adapted to be introduced into the cavum oris proprium in order to photograph also the oral surfaces of molars and praemolars at the same time.

Moreover I may provide a source of light for the camera in such a way that when taking the photograph said source is placed closely before the opened mouth and so that no direct rays can fall into the objective of the camera or into the eye.

Finally according to the invention all mirrors may be removable and interchangeable and may be made of a material adapted to be sterilized.

For a full understanding of the invention, the principles on which it is based and its mode of operation, reference is made to the accompanying drawings in which:

Fig. 2 shows a front elevation and partial cross-section of the same apparatus along the line 2—2 of Fig. 1.

Fig. 3 shows a mirror.

Fig. 4 shows another mirror.

Figure 1:
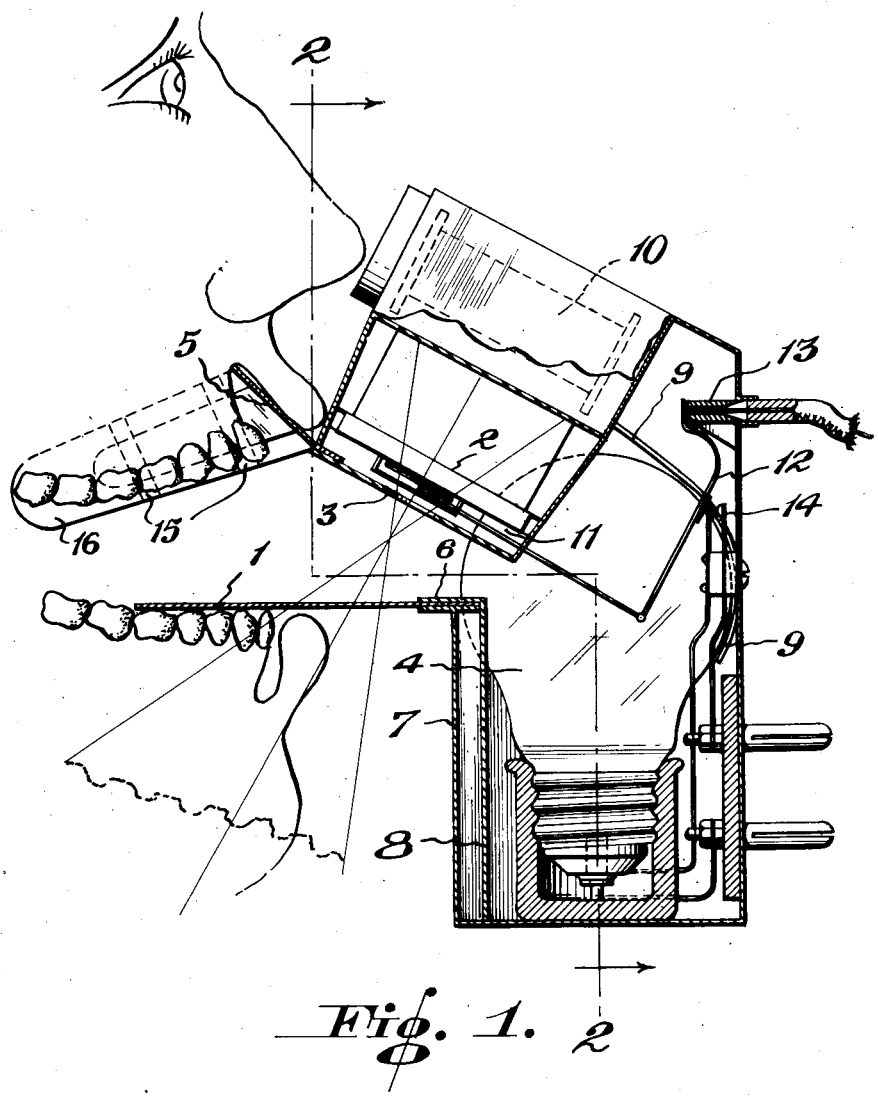
Fig. 1 shows in elevation and partial cross-section a preferred form of construction of an apparatus according to the invention.

In order that the following description may be easily understood an explanation is given of the stomatologic terminology used therein.

Teeth: front-teeth and lateral-teeth.

Occlusal surfaces: masticatory surfaces of the teeth.

Vestibulum oris: part of the mouth outside the teeth.

Cavum oris proprium: part of the mouth inside the teeth.

Vestibular surfaces: surfaces of the teeth facing the vestibulum oris.

Oral surfaces: surfaces of the teeth facing the cavum oris proprium.

Molars and praemolars: lateral teeth.

Front-teeth: incisives and canines.

Unit: combination of instruments.

Labial surfaces: surfaces of the front-teeth facing the lips.

Buccal surfaces: surfaces of the molars and praemolars facing the cheeks.

The apparatus comprises a mirror 1, the shape of which is chosen corresponding to the shape of the mouth and to the breadth of the effective light beam. This mirror is placed on the occlusal surfaces of the teeth opposite to the jaw to be photographed. The reflecting surface of the mirror is directed to the jaw to be photographed.

The objective 2 of the camera is placed closely before the lip of the jaw to be photographed, said objective being arranged in such a way that the beam of light starting from the jaw to be photographed cannot be interrupted or broken by lips, teeth or cheeks. The objective is further to be adjusted in such a way that the optical axis passes through the centre of the virtual image in the mirror of the jaw to be photographed.

A light source 4 is placed closely before the opened mouth and adjusted in such a way that direct light rays cannot fall into the objective of the camera or into the eye but the jaw to be photographed is fully illuminated on all sides.

In order to obtain on the same photograph also an illustration of the vestibular surfaces of the teeth a second mirror 5 is placed around the outer side of the jaw to be photographed. The shape and the size of this mirror conforms to the shape and the size of the vestibulum oris. The reflecting surface is directed to the teeth. The angle between this mirror and the teeth is chosen in such a way that the objective can produce a distinct photographic image of these surfaces. The mirror simultaneously serves to keep lips and cheeks away from the vestibular surfaces of the teeth.

In order to obtain a photographic image of the oral surfaces of the teeth a third mirror is placed inside the oral surfaces of the molars and praemolars. The reflecting surfaces of this mirror are directed to the teeth on the left and on the right hand side. The angles between these reflecting surfaces and the oral surfaces of the molars and praemolars are chosen in such a way that the objective can produce a distinct photographic image on these surfaces. The oral surfaces of the front teeth are already taken with the occlusal image.

The virtual image of the jaw to be photographed produced into the occlusal mirror substitutes this jaw and removes it, by way of expression, to a position opposite to the camera which itself cannot be placed opposite to the jaw to be photographed without breaking the effective light beam. Placing the objective closely before the lip of the jaw to be photographed is required in order to prevent lips, teeth or cheeks breaking the effective light beam and to leave sufficient space for fully illuminating the jaw to be photographed.

Hereinafter it will be explained how an apparatus for photographing the mouth designed according to the above mentioned principle may be practically made.

The mirror 1 the shape of which is made conforming to that of the mouth and to the breadth of the effective light beam is shown in Fig. 3. The broad portion is introduced into the mouth and placed onto the teeth opposite to the jaw to be photographed. The narrow portion is pushed into a slide guide 6. Mirrors of various sizes and shapes may be taken in order to make the apparatus correspond to individual circumstances. The mirrors may be easily sterilized by making them of an easily sterilizable material. The guide 6 is secured to a rigid projecting portion 7 in the window 8 which is provided in the front face of the apparatus in order to give passage to the light of two electric incandescent lamps 4. The light of each lamp is reflected by a reflector 9. Hence the illumination of the jaw is effected partly directly and partly indirectly through the intermediance of the reflectors 9 and the occlusal mirror 1.

In the form illustrated the camera proper is constructed for roll-films of the size 4 x 6½ cm. The size of the actual photograph is 4 x 4 cm. then. The film bobbins are located in light-proof holders adjacent to the camera proper and above the incandescent lamps. As the bobbins require less space than the camera the remaining space at the sides of the camera is made use of by placing the reflectors 9 and lamps 4 as close as possible to the camera. A counting mechanism 18 enables a correct distribution of the photographs on the film.

The walls of the bobbin holders project before the front face of the apparatus and the front of the camera proper is somewhat lower, thus offering space for the nose or the chin. In order to obtain space for the nose when the lower jaw is photographed an aperture in the front of the apparatus is left below the guide.

For the present purpose a simple objective will be sufficient. Precautions have been taken to prevent the objective from being moistened; in the illustrated embodiment by placing the objective behind the diaphragm. With regard to the required depth-sharpness at the short and continuously varying distances of the object the diaphragm is only of small size. Correct adjustment of the reflectors and the source of light in relation to the objective and diaphragm prevent direct light rays from falling into the camera.

The shutter which may be of usual design and be constituted by a simple instantaneous and time-shutter has been placed in the space 11 between objective and diaphragm. As the objective has to be placed closely to the lip no parts of the shutter are present on the lip-side of the objective. The shutter is operated by means of a wire-release in the holder 13 through the lever-system 12. When the shutter is opened the lever-system 12 operates a switch 14 located between the lamps in order to light the same simultaneously.

A holder at the side of the apparatus enables it to be attached to a bracket or dental-unit in such a way that the instrument may be rigidly secured and may be turned upside down according as to whether taking a photograph of the upper or lower jaw.

When taking a photograph of the vestibular surfaces of the teeth is required as well, the mirror 5, 16 as illustrated in Fig. 4 of the drawings is introduced into the vestibulum oris and thereafter secured to the apparatus. This mirror may have three separated portions. The centre portion 5 serves for reflecting the labial surfaces of the front-teeth and the lateral portions (16) serve for reflecting the buccal surfaces of the molars and the praemolars.

By means of a pair of small slides 15 the lateral portions 16 of the mirror are loosely slid onto two resilient wings 17 secured to the centre portion 5 of the mirror. The resilience of the wing 17 enables easy introduction of the vestibular mirror into the mouth and prevents the lateral portions of the mirror from being pressed into the gums when the mouth is opened. The parts of the mirror 5 and 16 are provided in various sizes and shapes. For taking photographs from the upper and lower jaw different shapes are required. Many constructions, arrangements and variations of vestibular mirrors may be made without departing from the scope of the invention.

For photographing the oral surfaces of molars and praemolars the mirrors at the left and the right hand side may be joined together and secured either to the occlusal mirror 1 or to the vestibular mirror 16.

Though I illustrated and described one preferred embodiment of my invention it is to be understood that several changes and modifications in the parts and the arrangement thereof may be made without departing from the scope of the invention as set forth in the subjoined claims.

The apparatus may be made for various sizes of the image and may be suitable for films or plates and may be provided with any kind of shutter etc.

What I claim is:

1. In combination, a plate-like mirror shaped substantially in conformity with the contour of the mouth and adapted to be inserted therein and applied against one set of teeth for fully reflecting the occlusal surfaces of the teeth of the other set, a support carrying said mirror, and a camera mounted on said support and focused on the reflected image of the teeth.

2. An apparatus as claimed in claim 1, characterized by the provision of at least one additional mirror supported in position to be introduced into the vestibulum oris to reflect the image of the vestibular surfaces of the teeth of the second set on the first mentioned mirror at a point removed from the first mentioned reflection.

3. An apparatus as claimed in claim 1, characterized by the provision of at least one additional mirror supported in position to be introduced into the cavum oris proprium for reflecting an image of the oral surfaces of molars and praemolars on said first mentioned mirror.

4. An apparatus as claimed in claim 1, characterized by the provision of a second mirrir supported in position to be introduced into the vestibulum oris to reflect an image of the vestibular surfaces of the teeth of the second set on the first mentioned mirror, and a third mirror supported in position to be introduced in the cavum oris proprium for reflecting an image of the oral surfaces of molars and praemolars on the first mentioned mirror.

5. An apparatus as claimed in claim 1, characterized by the provision of a source of light carried by said support and arranged to direct a light beam onto the second mentioned set of teeth.

6. An apparatus as claimed in claim 1, characterized by the provision of a source of light carried by said support and positioned to direct a light beam between said camera and said mirror onto the second mentioned set of teeth.

7. An apparatus as claimed in claim 1 characterized by the provision of a source of light carried by said support and arranged to direct a light beam upon the second mentioned set of teeth, and means for screening the objective of said camera and the eyes from the direct rays from said light source.

8. An apparatus as claimed in claim 1, characterized by the provision of a second mirror supported in position to be introduced into the vestibulum oris to reflect an image of the vestibular surfaces of the teeth of the second set on the first mentioned mirror, a third mirror supported in position to be introduced in the cavum oris proprium for reflecting an image of the oral surfaces of molars and praemolars on the first mentioned mirror, the several mirrors being removable, and a source of light carried by said support adapted to direct a light beam between the camera and the first mentioned mirror onto the teeth of the second mentioned set.

9. An apparatus as claimed in claim 1, characterized by the provision of a source of light carried by said support and arranged to be disposed externally of the mouth in which said mirror is inserted and to direct a beam of light on the teeth of the second mentioned set.

HENDRIK VAN HARTINGSVELT.